United States Patent
Nakatani et al.

(10) Patent No.: US 9,745,444 B2
(45) Date of Patent: Aug. 29, 2017

(54) COMPOSITION CONTAINING OXIDE OF TITANIUM, POLYMER COMPOSITION, AND MOLDED ARTICLE

(71) Applicant: Asahi Kasei Chemicals Corporation, Tokyo (JP)

(72) Inventors: Kosuke Nakatani, Tokyo (JP); Kenta Shibuya, Tokyo (JP); Daisuke Shimizu, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 46 days.

(21) Appl. No.: 14/786,691

(22) PCT Filed: Apr. 23, 2014

(86) PCT No.: PCT/JP2014/061381
§ 371 (c)(1),
(2) Date: Oct. 23, 2015

(87) PCT Pub. No.: WO2014/178311
PCT Pub. Date: Nov. 6, 2014

(65) Prior Publication Data
US 2016/0068653 A1 Mar. 10, 2016

(30) Foreign Application Priority Data

Apr. 30, 2013 (JP) ................................. 2013-095168

(51) Int. Cl.
 *C08K 3/22* (2006.01)
 *C08J 5/00* (2006.01)
(52) U.S. Cl.
 CPC ......... *C08K 3/22* (2013.01); *C08J 5/00* (2013.01); *C08J 2347/00* (2013.01); *C08K 2003/2241* (2013.01); *C08K 2201/005* (2013.01)
(58) Field of Classification Search
 CPC ................ C08L 9/00; C08K 2003/2241
 See application file for complete search history.

(56) References Cited

U.S. PATENT DOCUMENTS

| 4,501,857 A | 2/1985 | Kishimoto et al. |
| 4,673,714 A | 6/1987 | Kishimoto et al. |
| 4,980,421 A | 12/1990 | Teramoto et al. |
| 5,242,961 A | 9/1993 | Chamberlain et al. |
| 5,753,778 A | 5/1998 | Ko et al. |
| 5,910,566 A | 6/1999 | Ko et al. |
| 6,020,439 A | 2/2000 | Ko et al. |
| 2002/0099149 A1 | 7/2002 | Ko et al. |
| 2005/0167638 A1 | 8/2005 | Kojima et al. |
| 2008/0161469 A1 | 7/2008 | Hoss et al. |
| 2011/0294941 A1 | 12/2011 | Fujimoto et al. |
| 2013/0085244 A1* | 4/2013 | Zhao ................ C08F 110/02 526/126 |
| 2014/0121329 A1 | 5/2014 | Araki et al. |

FOREIGN PATENT DOCUMENTS

| CN | 101407564 A | 4/2009 |
| EP | 1209169 A1 | 5/2002 |
| EP | 2048164 A2 | 4/2009 |
| JP | H09-291121 A | 11/1997 |
| JP | H10-249193 A | 9/1998 |
| JP | 2001-336027 A | 12/2001 |
| JP | 2005-220151 A | 8/2005 |
| JP | 2006-160886 A | 6/2006 |
| JP | 2009-091574 A | 4/2009 |
| JP | 2011-246580 A | 12/2011 |
| KR | 2007-0120999 A | 12/2007 |
| WO | 00/08069 A1 | 2/2000 |
| WO | 2012/165120 A1 | 12/2012 |

OTHER PUBLICATIONS

International Search Report issued in corresponding International Patent Application No. PCT/JP2014/061381 dated Jul. 22, 2014.
European Search Report issued in counterpart European Patent Application No. 14791770.2 dated Mar. 24, 2016.

* cited by examiner

*Primary Examiner* — Wenwen Cai
(74) *Attorney, Agent, or Firm* — Morgan, Lewis & Bockius LLP

(57) ABSTRACT

A composition containing an oxide of titanium contains a conjugated dienic polymer and the oxide of titanium, wherein the content of the oxide of titanium is 0.10 to 75 ppm by mass in terms of titanium atom, and the average particle diameter of the oxide of titanium is 1.0 to 100 μm.

19 Claims, No Drawings

COMPOSITION CONTAINING OXIDE OF TITANIUM, POLYMER COMPOSITION, AND MOLDED ARTICLE

TECHNICAL FIELD

The present invention relates to a composition containing an oxide of titanium, a polymer composition containing the composition containing an oxide of titanium, and a molded article containing the polymer composition.

BACKGROUND ART

There are broadly used as elastomers homopolymers of conjugated diene monomers such as 1,3-butadiene and isoprene, or copolymers of conjugated diene monomers with vinyl aromatic monomers copolymerizable with the conjugated diene monomers, such as styrene.

Such copolymers of conjugated diene monomers with vinyl aromatic monomers are unvulcanizable thermoplastic elastomers, and are used as a modifier for impact-resistive transparent resins, polyolefin or polystyrene.

However, polymers containing olefinic unsaturated double bonds have the problem of the weather resistance due to the reactivity of the double bonds, and are used within a limited range, for example, where the polymers are not exposed to solar light. In order to solve this problem, there are known copolymers which are partially or completely saturated by hydrogenating the double bonds in the polymers.

There have been reported various usual methods of hydrogenating polymers having olefinic double bonds, and the methods are roughly classified into the following two methods. A first method is a method involving using a heterogeneous catalyst such as a metal-carrying catalyst in which a noble metal catalyst such as platinum, palladium or rhodium is carried on carbon, silica, alumina or the like. A second method is a method involving using a homogeneous catalyst of a Ziegler catalyst using nickel, cobalt or the like, or an organometal compound of rhodium, titanium or the like; and there are known, for example, a hydrogenation method involving using a catalyst in combination of a compound of a periodic table group VIII metal, particularly nickel or cobalt, and a proper reducing agent such as an alkylaluminum compound, and a method involving using a catalyst in combination of a bis(cyclopentadienyl)titanium compound and a proper reducing agent such as an alkylaluminum compound and hydrogenating unsaturated double bonds of a conjugated dienic polymer (for example, see Patent Literatures 1 to 7).

CITATION LIST

Patent Literature

Patent Literature 1: International Publication No. WO 00/08069
Patent Literature 2: U.S. Pat. No. 4,501,857
Patent Literature 3: U.S. Pat. No. 4,673,714
Patent Literature 4: U.S. Pat. No. 4,980,421
Patent Literature 5: U.S. Pat. No. 5,753,778
Patent Literature 6: U.S. Pat. No. 5,910,566
Patent Literature 7: U.S. Pat. No. 6,020,439

SUMMARY OF INVENTION

Technical Problem

However, although the weather resistance of the conjugated dienic polymers is improved by such hydrogenation reaction, the deterioration with time course still remains as a problem in applications exposed to solar light for a long time, and the like, and further methods for improving the weather resistance are demanded. Additionally, it is also known that the use of the hydrogenation catalyst as described above makes catalyst residues remain in polymers after the hydrogenation reaction and also causes a decrease in the transparency and a degradation in color tone (coloring), and polymers excellent in the balance among the weather resistance, the turbidity and the color tone are demanded.

Then, the present invention has been achieved in consideration of the above problems, and has an object to provide a composition containing an oxide of titanium excellent in the balance among the weather resistance, the transparency and the color tone, a polymer composition containing the composition containing an oxide of titanium, and a molded article containing the polymer composition.

Solution to Problem

As a result of exhaustive studies to solve the above-mentioned problem, the present inventors have found that the incorporation of a conjugated dienic polymer and a predetermined amount of an oxide of titanium, which has a specific particle diameter can solve the above problem, and this finding has led to the completion of the present invention.

That is, the present invention is as follows.

[1]
A composition containing an oxide of titanium, comprising: a conjugated dienic polymer and the oxide of titanium,
wherein a content of the oxide of titanium is 0.10 to 75 ppm by mass in terms of titanium atom; and
an average particle diameter of the oxide of titanium is 1.0 to 100 μm.

[2]
The composition containing the oxide of titanium according to the above [1], further comprising a lithium compound.

[3]
The composition containing the oxide of titanium according to the above [2], wherein a ratio (Ti/Li) of a content of the oxide of titanium in terms of titanium atom to a content of the lithium compound in terms of lithium atom is 0.0010 to 1.3.

[4]
The composition containing the oxide of titanium according to any one of the above [1] to [3], wherein the content of the oxide of titanium is 0.10 to 50 ppm by mass in terms of titanium atom.

[5]
The composition containing the oxide of titanium according to any one of the above [1] to [4], wherein the content of the oxide of titanium is 0.10 to 30 ppm by mass in terms of titanium atom.

[6]
The composition containing the oxide of titanium according to any one of the above [1] to [5], wherein a content of the oxide of titanium, which has a particle diameter of 0.010 μm or larger and 1.0 μm or smaller is 20% by mass or lower based on 100% by mass of a total amount of the oxide of titanium.

[7]
The composition containing the oxide of titanium according to any one of the above [1] to [6], wherein the oxide of titanium comprises at least one selected from the group consisting of titanium oxide, hydrous titanium oxide, titanium hydroxide and lithium titanate.

[8]

The composition containing the oxide of titanium according to any one of the above [1] to [7], wherein the conjugated dienic polymer comprises a hydrogenated conjugated dienic polymer.

[9]

The composition containing the oxide of titanium according to any one of the above [1] to [8], wherein the conjugated dienic polymer comprises a vinyl aromatic monomer unit.

[10]

The composition containing the oxide of titanium according to any one of the above [1] to [9], wherein the oxide of titanium comprises a reaction product of a titanium compound used as a hydrogenation catalyst for the conjugated dienic polymer.

[11]

The composition containing the oxide of titanium according to the above [10], wherein the titanium compound comprises a titanocene compound.

[12]

A polymer composition comprising the composition containing the oxide of titanium according to any one of the above [1] to [11].

[13]

A molded article comprising the polymer composition according to the above [12].

Advantageous Effects of Invention

The present invention can provide a composition containing an oxide of titanium excellent in the balance among the weather resistance, the transparency and the color tone, a polymer composition containing the composition containing an oxide of titanium, and a molded article containing the polymer composition.

DESCRIPTION OF EMBODIMENTS

Hereinafter, an embodiment (hereinafter, referred to as "the present embodiment") to carry out the present invention will be described in detail. The present invention is not limited to the following embodiment, and can be carried out under various changes and modifications within the scope of its gist. Here, in the present description, a "monomer unit" refers to a unit which constitutes a polymer and is a constituting unit deriving from the monomer.

[Composition Containing an Oxide of Titanium]

A composition containing an oxide of titanium according to the present embodiment comprises:
  a conjugated dienic polymer and an oxide of titanium,
  wherein the content of the oxide of titanium is 0.10 to 75 ppm by mass in terms of titanium atom; and
  the average particle diameter of the oxide of titanium is 1.0 to 100 μm.

[Conjugated Dienic Polymer]

A conjugated dienic polymer to be used in the present embodiment is not especially limited, and examples thereof include conjugated dienic polymers polymerized with a lithium-based initiator, and hydrogenated products thereof (hereinafter, also referred to as "hydrogenated conjugated dienic polymer"). Among these, the hydrogenated conjugated dienic polymer is preferable. Use of the hydrogenated conjugated dienic polymer tends to the more improvement in the weather resistance.

The weight-average molecular weight of the conjugated dienic polymer is preferably 500 to 1,000,000, more preferably 1,000 to 800,000, and still more preferably 10,000 to 500,000. The weight-average molecular weight of the conjugated dienic polymer can be measured in terms of polystyrene by using gel permeation chromatography (GPC) by a method described in Examples described later.

The conjugated dienic polymer is not especially limited, and examples thereof include homopolymers of a conjugated diene monomer, random, taper or block copolymers of a conjugated diene monomer with a vinyl aromatic monomer, and hydrogenated products thereof.

A usable conjugated diene monomer is not especially limited, and examples thereof include conjugated dienic compounds having 4 to 12 carbon atoms such as 1,3-butadiene, isoprene, piperylene, phenylbutadiene, 3,4-dimethyl-1,3-hexadiene and 4,5-diethyl-1,3-octadiene. Among these, 1,3-butadiene and isoprene are preferable. These may be used singly or in combinations of two or more.

The vinyl aromatic monomer copolymerizable with a conjugated diene monomer is not especially limited, and examples thereof include vinyl allyl compounds such as styrene, α-methylstyrene, styrene substituted with an alkoxy group, 2-vinylpyridine, 4-vinylpyridine, vinylnaphthalene and vinylnaphthalene substituted with an alkyl group. Among these, styrene and α-methylstyrene are preferable. These may be used singly or in combinations of two or more.

Among these, the conjugated dienic polymer preferably contains a vinyl aromatic monomer unit. By selecting such a conjugated dienic polymer and combining it with an oxide of titanium, the weather resistance tends to be more improved.

In the case where the conjugated dienic polymer contains a conjugated diene monomer unit and a vinyl aromatic monomer unit, for example, the ratio of the conjugated diene monomer unit:the vinyl aromatic monomer unit (mass ratio) is preferably 5:95 to 95:5, preferably 30:70 to 92:8, and preferably 50:50 to 90:10. Within such a mass ratio, a copolymer excellent in the impact resistance and good in the product processability tends to be provided.

The lithium-based initiator is not especially limited, and examples thereof include n-butyllithium and s-butyllithium. The amount of the lithium-based initiator used can be regulated arbitrarily depending on the molecular weight of a conjugated dienic polymer as a target. By carrying out a hydrogenation reaction on an obtained polymer solution, a hydrogenated conjugated dienic polymer can be produced.

A titanium compound to be used for the hydrogenation reaction is not especially limited as long as being used usually in that field, and examples thereof include titanocene compounds such as cyclopentadienyltitanium compounds. More specific examples thereof include cyclopentadienyltitanium halides, cyclopentadienyl(alkoxy)titanium dihalides, bis(cyclopentadienyl)titanium dihalides, bis(cyclopentadienyl)titanium dialkylates, bis(cyclopentadienyl)titanium diallyl compounds and bis(cyclopentadienyl)titanium dialkoxy compounds. These may be used singly or in combinations of two or more. Among these, titanocene compounds are preferable. Use of a titanocene compound further facilitates the conversion of a titanium compound remaining in a hydrogenated conjugated dienic polymer to an oxide of titanium by a method described later, and also tends to allow simple regulation of the particle diameter of the resultant oxide of titanium.

The amount of the titanium compound to be used in the hydrogenation reaction is preferably 0.010 to 20 mmol, more preferably 0.050 to 5 mmol, and still more preferably 0.10 to 1 mmol, per 100 g of the conjugated dienic polymer. When the amount of the titanium compound used is in the above range, the hydrogenation reaction velocity is improved, which results in the good productivity. Further, since the unnecessary amount of the catalyst is small, it is economically preferable, and the amount of a chemical substance to be used for removing the catalyst after the reaction tends to be suppressed.

The reducing agent usable together with the titanium compound is not especially limited as long as being a reducing agent to be usually used in the hydrogenation reaction, and examples thereof include alkylaluminum compounds, alkylmagnesium compounds, organolithium compounds and metal hydrides. These may be used singly or in combinations of two or more.

The hydrogenation reaction using the above titanium-based catalyst is not especially limited, and can be carried out, for example, by using methods described in International Publication No. WO 00/08069, and U.S. Pat. Nos. 4,501,857, 4,673,714, 4,980,421, 5,753,778, 5,910,566 and 6,020,439.

The hydrogenation reaction can be carried out in an inactive solvent. Here, the "inactive solvent" refers to a solvent which does not react with any reactants in the polymerization reaction and the hydrogenation reaction. Examples of such an inactive solvent is not especially limited, and include aliphatic hydrocarbons such as n-pentane, n-hexane, n-heptane and n-octane; alicyclic hydrocarbons such as cyclopentane, cyclohexane and cycloheptane; and ethers such as diethyl ether and tetrahydrofuran. These may be used singly or in combinations of two or more. The concentration of the conjugated dienic polymer in the inactive solvent is preferably 5.0 to 50% by mass, and more preferably 10 to 30% by mass.

More specifically, it is preferable that the hydrogenation reaction be carried out by maintaining a polymer solution at a constant temperature under an inert gas atmosphere such as hydrogen, helium, argon or nitrogen, thereafter adding a hydrogenation catalyst under stirring or no stirring, and injecting hydrogen gas at a constant pressure. Further, it is preferable that the hydrogenation reaction be carried out at a temperature in the range of 30 to 150° C., and at a pressure in the range of 2 to 30 kg/cm$^2$.

When the temperature of the hydrogenation reaction is in the above range, the reactivity can be improved to achieve a sufficient reaction yield; and also, the side-reaction due to the thermal degradation of the macromolecule tends to be suppressed. Further when the pressure in the hydrogenation reaction is in the above range, the reaction velocity tends to be improved to thereby make the reaction time become short, and the cost invested for a reactor can be also suppressed, which are economically preferable.

The hydrogenation catalyst as described above is capable of selectively hydrogenating unsaturated double bonds of conjugated diene units in a homopolymer of a conjugated diene, or a random, taper or block copolymer of a conjugated diene with a vinyl aromatic monomer, having a weight-average molecular weight of 500 to 1,000,000.

[Oxide of Titanium]

The composition containing an oxide of titanium contains 0.10 to 75 ppm by mass in terms of titanium atom of an oxide of titanium, which has an average particle diameter of 1.0 to 100 µm. Here, the "in terms of titanium atom" refers to an amount of titanium atoms in a titanium compound containing compounds such as titanium oxide, titanium hydroxide and lithium titanate. Specifically, the amount can be measured by a method described in Examples.

The oxide of titanium is not especially limited in its kind, and examples thereof include crystalline titanium oxides such as rutile, anatase and brookite ones; hydrous titanium oxides such as noncrystalline titanium oxide, orthotitanic acid and metatitanic acid; and composite oxides of titanium and dissimilar metals such as titanium hydroxide, lithium titanate, barium titanate and strontium titanate. Among these, the oxide of titanium preferably contains at least one selected from the group consisting of titanium oxide, hydrous titanium oxide, titanium hydroxide and lithium titanate. Use of such an oxide of titanium tends to provide a composition containing an oxide of titanium excellent in the weather resistance and the color tone. These may be used singly or in combinations of two or more.

Further, the oxide of titanium may contain reaction products of the titanium compound used as the hydrogenation catalyst of the conjugated dienic polymer. Use of such an oxide of titanium tends to provide the excellent economic efficiency and productivity. Specifically, in the case where the conjugated dienic polymer is a hydrogenated conjugated dienic polymer which has been hydrogenated using the titanium compound, the hydrogenated conjugated dienic polymer can contain the titanium compound. Therefore, the titanium compound may be prepared as an oxide of titanium, which has an average particle diameter of 1.0 to 100 µm, and the content of the oxide of titanium may be controlled so as to become 0.10 to 75 ppm by mass. Specifically, a method can be employed in which the titanium compound as the catalyst is made into the oxide of titanium, and particles of the obtained oxide of titanium are made to be grown into a predetermined average particle diameter, for example, by contact with water or the like. Here, in the case where the particles of the oxide of titanium are made to be grown by contact with water, the particles tend to grow more when the contact time is longer or when the contact frequency is higher, though depending on the content of titanium and the amount of water. The content of the oxide of titanium can be controlled by a method such as filtration.

The average particle diameter of the oxide of titanium is 1.0 to 100 µm, preferably 5.0 to 75 µm, and more preferably 10 to 50 µm. When the average particle diameter of the oxide of titanium is 1 µm or larger, the weather resistance of the conjugated dienic polymer is more improved. Further when the average particle diameter of the oxide of titanium is 100 µm or smaller, the transparency of the conjugated dienic polymer is more improved.

The content of the oxide of titanium, which has a particle diameter of 0.010 µm or larger and 1.0 µm or smaller is preferably 20% by mass or lower, more preferably 10% by mass or lower, and still more preferably 5% by mass or lower, based on 100% by mass of the total amount of the oxide of titanium. The lower limit of the content of the oxide of titanium, which has a particle diameter of 0.010 µm or larger and 1.0 µm or smaller is not especially limited, but 0.001% by mass or higher is preferable. When the oxide of titanium has such a particle diameter distribution, the weather resistance and the color tone of the composition containing an oxide of titanium tends to be more improved. Here, in the case where the composition containing an oxide of titanium contains other metal compound particles other than titanium ones, for example, in the case where the metal compounds contain an oxide of titanium and a lithium compound, the above "content of the oxide of titanium, which has a particle diameter of 0.010 µm or larger and 1.0 µm or smaller" can be replaced in reading by "the content of the metal compounds having a particle diameter of 0.010 µm or larger and 1.0 µm or smaller".

Further the content of the oxide of titanium, which has a particle diameter of 0.010 µm or larger and 2.0 µm or smaller is preferably 20% by mass or lower, more preferably 10% by mass or lower, and still more preferably 5% by mass or lower, based on 100% by mass of the total amount of the oxide of titanium. The lower limit of the content of the oxide of titanium, which has a particle diameter of 0.010 µm or larger and 2.0 µm or smaller is not especially limited, but 0.001% by mass or higher is preferable. When the oxide of titanium has such a particle diameter distribution, the weather resistance and the color tone of the composition containing an oxide of titanium tends to be more improved. Here, in the case where the composition containing an oxide of titanium contains other metal compound particles other than titanium ones, for example, in the case where the metal compounds contain an oxide of titanium and a lithium compound, the above "content of the oxide of titanium, which has a particle diameter of 0.010 µm or larger and 2.0 µm or smaller" can be replaced in reading by "the content of the metal compounds having a particle diameter of 0.010 µm or larger and 2.0 µm or smaller".

The content of the oxide of titanium in terms of titanium atom is 0.10 to 75 ppm by mass, preferably 0.10 to 50 ppm by mass, and more preferably 0.10 to 30 ppm by mass. Further the content of the oxide of titanium in terms of titanium atom is 0.10 ppm by mass or higher, preferably 0.50 ppm by mass or higher, more preferably 1.0 ppm by mass or higher, and still more preferably 5.0 ppm by mass or higher. Further the content of the oxide of titanium is 75 ppm by mass or lower, preferably 50 ppm by mass or lower, more preferably 35 ppm by mass or lower, and still more preferably 30 ppm by mass or lower. When the content of the oxide of titanium is 0.10 ppm by mass or higher, a sufficient weather resistance improving effect on the conjugated dienic polymer can be attained, and the color tone of the composition containing an oxide of titanium is more improved. By contrast, when the content of the oxide of titanium is 75 ppm by mass or lower, the transparency and the color tone of the conjugated dienic polymer are more improved.

The content of the oxide of titanium can be determined by a method described in Examples described later. Further the average particle diameter of the oxide of titanium contained in the conjugated dienic polymer can be measured by analyzing a polymer solution obtained by dissolving the composition containing an oxide of titanium in an inactive solvent by using a laser diffraction type particle size distribution analyzer. More specifically, the average particle diameter can be determined by a method described in Examples.

Here, in the case where the composition containing an oxide of titanium contains other metal compound particles other than titanium ones, for example, in the case where the metal compounds contain an oxide of titanium and a lithium compound, "the average particle diameter of the oxide of titanium" can be replaced in reading by "the average particle diameter of the metal compounds". Here, "the average particle diameter of the metal compounds" means an average particle diameter of particles composed of the oxide of titanium and the other metal compounds, or an average particle diameter of particles of the oxide of titanium and particles of the other metal compounds.

A production method of the composition containing an oxide of titanium is not especially limited, and includes a method in which a solid conjugated dienic polymer and an oxide of titanium are mixed by using a Plastomill, an extruder, a roll or the like to thereby disperse the oxide of titanium in the conjugated dienic polymer, a method in which an oxide of titanium is added to a polymer solution containing the conjugated dienic polymer dissolved therein, stirring the solution, and thereafter removing the solvent by a heating or a pressure reduction operation, and a method in which a titanium alkoxide and water are added to a polymer solution to hydrolyze the titanium alkoxide to thereby produce an oxide of titanium in the system. At this time, by controlling the mixing method (stirring method), the average particle diameter can be controlled. Additionally in the case where the conjugated dienic polymer is a hydrogenated conjugated dienic polymer, the composition containing an oxide of titanium may be prepared so that an oxide of titanium, which has an average particle diameter of 1 to 100 µm is formed in the conjugated dienic polymer, as described above.

[Lithium Compound]

The composition containing an oxide of titanium preferably further contains a lithium compound from the viewpoint of the transparency.

The ratio (Ti/Li) of the content of the oxide of titanium in terms of titanium atom to the content of the lithium compound in terms of lithium atom is preferably 0.0010 to 1.3, more preferably 0.010 to 1.1, and still more preferably 0.050 to 0.90. Further the ratio (Ti/Li) is preferably 0.0010 or higher, more preferably 0.010 or higher, and still more preferably 0.050 or higher. Further the ratio (Ti/Li) is preferably 1.3 or lower, more preferably 1.1 or lower, and still more preferably 0.90 or lower. When the ratio (Ti/Li) is 0.0010 or higher, the turbidity of the composition containing an oxide of titanium tends to decrease. Further when the ratio (Ti/Li) is 1.3 or lower, the weather resistance and the color tone of the composition containing an oxide of titanium tends to be improved.

The mass ratio (Ti/Li) of the oxide of titanium to the lithium compound in terms of metal atom can be measured specifically by a method described in Examples.

The lithium compound is not especially limited, and examples thereof include lithium salts such as lithium carbonate, lithium hydroxide and lithium titanate; and composite oxides of lithium and dissimilar metals. Among these, the lithium compound preferably includes at least one selected from the group consisting of lithium carbonate and lithium titanate. By using such a lithium compound, the color tone of the composition containing an oxide of titanium tends to be more improved. These may be used singly or in combinations of two or more.

The lithium compound may further include reaction products of the lithium compound used as an initiator of the conjugated dienic polymer. By using such a lithium compound, the economic efficiency and the productivity tends to be better. A preparation method of the composition containing an oxide of titanium in the case of containing the lithium compound is not especially limited, and the same method as the above-mentioned method of dispersing the oxide of titanium can be used.

[Polymer Composition]

A polymer composition according to the present embodiment contains the above composition containing an oxide of titanium. Thereby, the polymer composition results in being excellent in the balance among physical properties of the weather resistance, the transparency and the color tone. A production method of the polymer composition is not especially limited as long as being a known method of being capable of mixing the above composition containing an oxide of titanium and any additives. Additives to be added as required are not especially limited, and examples thereof include various types of elastomers, resins, plasticizers and inorganic fillers. These additives can be used by mixing in arbitrary proportions.

[Molded Article]

A molded article according to the present embodiment contains the above polymer composition. Since the polymer composition is excellent in the balance among physical properties of the weather resistance, the transparency and the color tone, the polymer composition is processed into a molded article with various shapes, and is allowed to be used in broad applications. A molding method of the molded article is not especially limited, and conventionally known methods can be used.

EXAMPLES

Hereinafter, the present embodiment will be described in detail based on Examples, but the present embodiment is not limited thereto.

<Methods for Identifying Structures of and Methods for Measuring Physical Properties of Conjugated Dienic Polymers Obtained in Production Examples>

(1) Measurement of the Styrene Content of a Conjugated Dienic Polymer

The styrene content was measured by using a chloroform solution of a conjugated dienic polymer obtained in Production Examples with an ultraviolet spectrometer (manufactured by Shimadzu Corp., UV-2450).

(2) Measurement of the Weight-Average Molecular Weight of a Conjugated Dienic Polymer The weight-average molecular weight (in terms of polystyrene) was measured by using a THF solution of a conjugated dienic polymer obtained in Production Examples and by a GPC (manufactured by Tosoh Corp., HLC-8220).

(3) Measurement of the Hydrogenation Ratio

The hydrogenation ratio of double bonds in a conjugated dienic polymer obtained in Production Examples was measured by an NMR (manufactured by JEOL Ltd., apparatus name: JNM-ECS400).

(4) Measurement of the Content of Metal Compounds in Terms of Metal Atom (Hereinafter, Also Referred to as "Metal Amount") Contained in a Conjugated Dienic Polymer Obtained in Production Examples The metal amount contained in a conjugated dienic polymer obtained in Production Examples was measured by using an inductively coupled plasma (ICP, manufactured by Shimadzu Corp., apparatus name: ICPS-7510). First, the conjugated dienic polymer was completely dissolved in sulfuric acid and nitric acid. Then, the aqueous solution containing metal components was sprayed in an argon plasma; the intensity of light emitted therefrom having a wavelength characteristic of each metal element was measured; and the metal amount contained in the conjugated dienic polymer was determined by the calibration curve method. Here, the content of titanium or lithium in terms of metal atom was determined as a measurement result (a titanium amount or a lithium amount) of titanium or lithium by ICP.

Production Example 1

There was prepared a polymer solution of Production Example 1 containing 12.5% by mass of a polystyrene-polybutadiene-polystyrene block copolymer (styrene content: 30.0% by mass, butadiene content: 70.0% by mass, weight-average molecular weight: 50,000) by a conventionally known successive living anionic polymerization method using n-butyllithium as a polymerization initiator in cyclohexane. The obtained polymer solution was vacuum dried to thereby obtain a conjugated dienic polymer of Production Example 1. There are shown in Table 1 the measurement results of metal amounts in the conjugated dienic polymer obtained in Production Example 1.

Production Example 2

The polymer solution prepared in Production Example 1 was put in an autoclave reactor, and heated at 60° C. under stirring at 400 rpm. 1.0 mmol of lithium hydride and 0.8 mmol of bis(cyclopentadienyl)titanium dichloride were added to the polymer solution after the heating; and the polymer solution was pressurized with hydrogen of 10 kg/cm$^2$ to carry out the hydrogenation reaction to thereby obtain a polymer solution of Production Example 2 containing a hydrogenated conjugated dienic polymer.

Water in an amount of 0.01 time and methanol in an amount of 0.01 time the volume of the polymer solution were added to the polymer solution, and mixed at 60° C. for 15 min, and thereafter allowed to stand still for 24 hours in an autoclave; and thereafter, the polymer solution was vacuum dried to thereby obtain a conjugated dienic polymer of Production Example 2. The conjugated dienic polymer obtained in Production Example 2 was analyzed by an NMR (manufactured by JEOL Ltd., apparatus name: JNM-ECS400), and as a result, it was confirmed that 98% or more of double bonds in the polybutadiene block was hydrogenated. There are shown in Table 1 the measurement results of metal amounts in the conjugated dienic polymer obtained in Production Example 2. The content of titanium in terms of metal atom was 100 ppm.

Production Example 3

The polymer solution prepared in Production Example 2, a 30% hydrogen peroxide aqueous solution in an amount of 2 times the volume of the polymer solution, and citric acid in an amount of 3 times the number of moles of Ti were mixed in a tank with stirring blades at 60° C. for 24 hours. The obtained mixed liquid was allowed to stand still for 2 hours to be separated into a polymer solution layer and a hydrogen peroxide aqueous solution layer; and the hydrogen peroxide layer was removed to thereby obtain a polymer solution of Production Example 3. The polymer solution after extraction of metal residues was vacuum dried to thereby obtain a conjugated dienic polymer of Production Example 3. There are shown in Table 1 the measurement results of metal amounts in the conjugated dienic polymer obtained in Production Example 3.

Production Example 4

The polymer solution prepared in Production Example 2, and water in an amount of 2 times the volume of the polymer solution were mixed in a tank with stirring blades at 60° C. for 12 hours. Thereafter, Silika #300S-A (manufactured by Chuo Silika Co., Ltd.) was mixed therewith so as to be 200 ppm in terms of Si atom based on the polymer solution, and filtered with a filter having a pore diameter of 1 μm. Water in an amount of 0.01 time and methanol in an amount of 0.01 time the volume of the polymer solution after the filtration were added to the polymer solution, mixed at 60° C. for 15 min, and thereafter allowed to stand still in an autoclave for 18 hours. The polymer solution was vacuum dried to thereby obtain a conjugated dienic polymer of Production Example 4. There are shown in Table 1 the measurement results of metal amounts in the conjugated dienic polymer obtained in Production Example 4.

Production Example 5

The polymer solution prepared in Production Example 1 was put in an autoclave reactor, and heated at 70° C. under stirring at 400 rpm. Thereafter, a nickel 2-ethyl-hexanoate/ lithium hydride catalyst was added to the polymer solution so that the content of nickel in terms of metal atom became 100 ppm. Thereafter, the hydrogenation reaction was carried out under a hydrogen pressure of 700 psig for 60 min; thereafter, the polymer solution was heated up to 90° C., and held thereat further for 25 min to carry out the hydrogenation reaction to thereby obtain a polymer solution containing a hydrogenated conjugated dienic polymer. The polymer solution was vacuum dried to thereby obtain a conjugated dienic polymer of Production Example 5. The conjugated dienic polymer obtained in Production Example 5 was analyzed by an NMR (manufactured by JEOL Ltd., apparatus name: JNM-ECS400), and as a result, it was confirmed that 98% or more of double bonds in the polybutadiene block was hydrogenated. There are shown in Table 1 the measurement results of metal amounts in the conjugated dienic polymer obtained in Production Example 5.

Production Example 6

The polymer prepared in Production Example 4 was subjected to shearing at 160° C. for 1 hour by a Labo Plastomill to thereby obtain a conjugated dienic polymer of Production Example 6. There are shown in Table 1 the measurement results of metal amounts in the conjugated dienic polymer obtained in Production Example 6.

Production Example 7

Water in an amount of 0.03 time and methanol in an amount of 0.03 time the volume of the polymer solution after extraction of metal residues prepared in Production Example 4 were added to the polymer solution, mixed at 60° C. for 15 min, and allowed to stand still in an autoclave for 3 days. Thereafter, the mixed liquid (a polymer solution phase+a water phase) was vacuum dried to thereby obtain a conjugated dienic polymer of Production Example 7. There are shown in Table 1 the measurement results of metal amounts in the conjugated dienic polymer obtained in Production Example 7.

TABLE 1

| | ICP Analysis Results of Polymers (ppm) | | |
| --- | --- | --- | --- |
| | Li | Ti | Ni |
| Production Example 1 | 100 | 0 | 0 |
| Production Example 2 | 120 | 100 | 0 |
| Production Example 3 | 0.4 | 0 | 0 |
| Production Example 4 | 5 | 25 | 0 |
| Production Example 5 | 120 | 0 | 100 |
| Production Example 6 | 5 | 25 | 0 |
| Production Example 7 | 5 | 25 | 0 |

<Measurement Methods of Physical Properties of Compositions Containing an Oxide of Titanium Obtained in Examples and Comparative Examples>

(5) Measurement of the Metal Compounds in Terms of Metal Atom (Metal Amounts) Contained in a Composition Containing an Oxide of Titanium Obtained in Examples or Comparative Examples The measurement of the metal amounts contained in a block copolymer contained in a composition containing an oxide of titanium obtained in Examples or Comparative Examples described later was carried out by using an inductively coupled plasma (ICP, manufactured by Shimadzu Corp., apparatus name: ICPS-7510). First, the polymer was completely dissolved in sulfuric acid and nitric acid; the aqueous solution containing metal components was sprayed in an argon plasma; the intensity of light emitted therefrom having a wavelength characteristic of each metal element was measured; and the metal amounts contained in the composition containing an oxide of titanium were determined by the calibration curve method.

(6) Color Tone

A composition containing an oxide of titanium obtained in Examples and Comparative Examples described later was compression molded to thereby fabricate a sheet of 2 mm in thickness; and the b value of the obtained sheet was measured by using a color difference meter (manufactured by Nippon Denshoku Industries Co., Ltd., ZE-2000). In the evaluation, the higher b value was, the more yellowish, and therefore the poorer in the color tone, a molded article of the composition containing an oxide of titanium was.

[Evaluation Criteria]
AAA: the b value was lower than 2.
AA: the b value was 2 or higher and lower than 3.
A: the b value was 3 or higher and lower than 5.
B: the b value was 5 or higher and lower than 10.
C: the b value was 10 or higher.

(7) Transparency

A composition containing an oxide of titanium obtained in Examples and Comparative Examples described later was compression molded to thereby fabricate a sheet of 2 mm in thickness; and the haze value of the obtained sheet in a liquid paraffin was measured by using a haze meter (manufactured by Nippon Denshoku Industries Co., Ltd., NDH-1001DP). The haze value was taken as an index of the transparency. In the evaluation, the lower haze value was, the higher a molded article of the composition containing an oxide of titanium was in the transparency.

[Evaluation Criteria]
AAA: the haze value was lower than 3%.
AA: the haze value was 3% or higher and lower than 6%.
A: the haze value was 6% or higher and lower than 10%.
B: the haze value was 10% or higher and lower than 15%.
C: the haze value was 15% or higher.

(8) Particle Diameter (Average Particle Diameter, Particle Size Distribution)

The particle diameter of metal compound particles contained in a composition containing an oxide of titanium obtained in Examples and Comparative Examples described later was measured by the following method using a laser diffraction particle size distribution analyzer (manufactured by HORIBA Ltd., LA-300).

A cyclohexane solution of a composition containing an oxide of titanium was dropwise added in a circulation bath in which cyclohexane was circulated, and the circulation concentration was controlled so that the transmittance became in the range of 70 to 98%. Then, the particle diameter was measured under the following condition.

Here, in the case where a composition containing an oxide of titanium contained metals other than titanium, the average particle diameter determined by the following method was a particle diameter of the whole metal compound particles including the oxide of titanium and the other metal compounds.

[Measurement Condition]
Measurement system: Mie scattering theory
Measurement range: 0.1 to 600 μm
Measurement time: 20 sec
Light source: 650-nm 5-mW semiconductor laser
Data reading frequency: 5 to 10 times
Measurement temperature: 25° C.

Here, the average particle diameter refers to an arithmetic mean (mean size), and is a value obtained by arithmetically averaging a frequency distribution. It is represented by the following expression.

$$\text{An arithmetic mean(mean size)} = \Sigma\{q(J) \times X(J)\}/\Sigma\{q(J)\}$$

J: diameter (particle diameter partition number)
Q(J): frequency distribution value (%)
X(J): a representative value (μm) in a J-th particle diameter range Further, the content (% by volume) of the oxide of titanium, which has a particle diameter of 1.0 μm or smaller in the oxide of titanium and the content (% by volume) of the oxide of titanium, which has a particle diameter of 2.0 μm or smaller therein were determined by the under size in the LA-300 software.

(9) Weather Resistance Test

A composition containing an oxide of titanium obtained in Examples and Comparative Examples described later was compression molded to thereby fabricate a sheet of 2 mm in thickness; the obtained sheet was subjected to an ultraviolet irradiation test at 40° C. using a sunshine weather meter (manufactured by Suga Test Instruments Co., Ltd., Sunshine Weather Meter S80); and the retention rate of the tensile elongation at break was calculated by comparison with the tensile elongation at break of the sample sheet before the irradiation, and was taken as an index of the weather resistance. The tensile elongation at break was measured according to JIS K6251 using a No. 3 dumbbell at a crosshead speed of 500 mm/min.

[Evaluation Criteria]
AAA: the retention rate of the elongation at break was 95% or higher.
AA: the retention rate of the elongation at break was lower than 95% and 90% or higher.
A: the retention rate of the elongation at break was lower than 90% and 85% or higher.
B: the retention rate of the elongation at break was lower than 85% and 80% or higher.
C: the retention rate of the elongation at break was lower than 80%.

(10) Analysis of the State of Metal Components in the Composition Containing an Oxide of Titanium Metal components contained in a composition containing an oxide of titanium obtained in Examples and Comparative Examples described later were analyzed by using an X-ray diffractometer XRD (manufactured by Rigaku Corp., Ultra-IV (Cu tube)) under the conditions of excitation voltage: current=40 kV:40 mA, slit DS=1°, SS opened, RS opened, vertical slit of 10 mm, scanning range 2θ=5 to 65° C. (0.02°/step) and scanning speed of 1 to 10°/min. The state of the oxide of titanium contained in the polymer was thereby analyzed.

Example 1

To the polymer solution obtained in Production Example 1, a titanium oxide (manufactured by Junsei Chemical Co., Ltd., rutile type, average particle diameter: 1.5 to 2.1 μm) was added in an amount of 30 ppm by mass in terms of titanium atom based on the polymer solution, and mixed. Thereafter, the solvent was removed from the mixed liquid by vacuum drying to thereby obtain a composition containing an oxide of titanium of Example 1 in which the titanium oxide was dispersed. The analysis results of the obtained composition containing an oxide of titanium are shown in Table 2. Here, the ultraviolet irradiation time for the weather resistance was made to be 15 min.

Example 2

To the polymer solution obtained in Production Example 1, tetramethoxytitanium (manufactured by Sigma-Aldrich Corp.) in an amount of 10 ppm by mass in terms of titanium atom based on the polymer solution and water in an amount of 100 times the number of moles of titanium atoms were added, and mixed. Thereafter, the solvent was removed from the mixed liquid by vacuum drying to thereby obtain a composition containing an oxide of titanium of Example 2. Metal components contained in the obtained composition containing an oxide of titanium were a mixture of titanium oxide and lithium titanate. Further as a result of the analysis of the particle diameter, the average particle diameter was 40 μm. The analysis results of the obtained composition containing an oxide of titanium are shown in Table 2. Here, the ultraviolet irradiation time for the weather resistance was made to be 15 min.

Example 3

To the polymer solution obtained in Production Example 3, a titanium oxide (manufactured by Junsei Chemical Co., Ltd., rutile type, average particle diameter: 1.5 to 2.1 μm) was added in an amount of 30 ppm by mass in terms of titanium atom based on the polymer solution, and mixed. Thereafter, the solvent was removed from the mixed liquid by vacuum drying to thereby obtain a composition containing an oxide of titanium of Example 3 in which the titanium oxide was dispersed. The analysis results of the obtained composition containing an oxide of titanium are shown in Table 2. Here, the ultraviolet irradiation time for the weather resistance was made to be 500 hours.

Example 4

The polymer obtained in Production Example 4 was used as a composition containing an oxide of titanium for Example 4. Metal components contained in the composition containing an oxide of titanium were a mixture of titanium oxide and lithium titanate. Further as a result of the analysis of the particle diameter, the average particle diameter of the whole of the titanium oxide and the lithium titanate was 20

μm. The analysis results of the obtained composition containing an oxide of titanium are shown in Table 2. Here, the ultraviolet irradiation time for the weather resistance was made to be 500 hours.

Example 5

To the polymer solution obtained in Production Example 3, a titanium oxide (manufactured by Junsei Chemical Co., Ltd., rutile type, average particle diameter: 1.5 to 2.1 μm) in an amount of 35 ppm by mass in terms of titanium atom based on the polymer solution, and lithium carbonate (manufactured by Adachi New Industrial Co., average particle diameter: 3 μm) in an amount of 30 ppm by mass in terms of lithium atom based on the polymer solution were added, and mixed. Thereafter, the solvent was removed by vacuum drying to thereby obtain a composition containing an oxide of titanium of Example 5 in which the titanium oxide and the lithium carbonate were dispersed. As a result of the analysis of the particle diameter, the average particle diameter of the whole of the titanium oxide and the lithium carbonate was 2.5 μm. The analysis results of the obtained composition containing an oxide of titanium are shown in Table 2. Here, the ultraviolet irradiation time for the weather resistance was made to be 500 hours.

Comparative Example 1

The polymer obtained in Production Example 1 was used as a composition containing an oxide of titanium for Comparative Example 1. The analysis results of the composition containing an oxide of titanium are shown in Table 3. Here, the ultraviolet irradiation time for the weather resistance was made to be 15 min.

Comparative Example 2

To the polymer solution obtained in Production Example 1, a titanium oxide (manufactured by Junsei Chemical Co., Ltd., rutile type, average particle diameter: 1.5 to 2.1 μm) was added in an amount of 200 ppm by mass in terms of titanium atom based on the polymer solution, and mixed. Thereafter, the solvent was removed by vacuum drying to thereby obtain a composition containing an oxide of titanium of Comparative Example 2 in which the titanium oxide was dispersed. The analysis results of the obtained composition containing an oxide of titanium are shown in Table 3. Here, the ultraviolet irradiation time for the weather resistance was made to be 15 min.

Comparative Example 3

The polymer obtained in Production Example 2 was used as a composition containing an oxide of titanium for Comparative Example 3. Metal components contained in the composition containing an oxide of titanium were a mixture of titanium oxide and lithium titanate. Further as a result of the analysis of the particle diameter, the average particle diameter of the whole of the titanium oxide and the lithium titanate was 20 μm. The analysis results of the obtained composition containing an oxide of titanium are shown in Table 3. Here, the ultraviolet irradiation time for the weather resistance was made to be 500 hours.

Comparative Example 4

The polymer obtained in Production Example 3 was used as a composition containing an oxide of titanium for Comparative Example 4. The analysis results of the composition containing an oxide of titanium are shown in Table 3. Here, the ultraviolet irradiation time for the weather resistance was made to be 500 hours.

Comparative Example 5

The polymer obtained in Production Example 5 was used as a composition containing an oxide of titanium for Comparative Example 5. The analysis results of the composition containing an oxide of titanium are shown in Table 3. Here, the ultraviolet irradiation time for the weather resistance was made to be 500 hours.

Comparative Example 6

To the polymer solution obtained in Production Example 3, tetramethoxytitanium (manufactured by Sigma-Aldrich Corp.) in an amount of 100 ppm by mass in terms of titanium atom based on the polymer solution and water in an amount of 100 times the number of moles of titanium atoms were added, and mixed. Thereafter, the solvent was removed by vacuum drying to thereby obtain a composition containing an oxide of titanium of Comparative Example 6. Metal components contained in the obtained composition containing an oxide of titanium were a mixture of titanium oxide and lithium titanate. Further as a result of the analysis of the particle diameter, the average particle diameter of the whole of the titanium oxide and the lithium titanate was 40 μm. The analysis results of the obtained composition containing an oxide of titanium are shown in Table 3. Here, the ultraviolet irradiation time for the weather resistance was made to be 500 hours.

Comparative Example 7

The polymer obtained in Production Example 6 was used as a composition containing an oxide of titanium for Comparative Example 7. The analysis results of the composition containing an oxide of titanium are shown in Table 3. Here, the ultraviolet irradiation time for the weather resistance was made to be 500 hours.

Comparative Example 8

The polymer obtained in Production Example 7 was used as a composition containing an oxide of titanium for Comparative Example 8. The analysis results of the composition containing an oxide of titanium are shown in Table 3. Here, the ultraviolet irradiation time for the weather resistance was made to be 500 hours.

TABLE 2

| | Production Example | Oxide of Titanium | | | | Ti/Li *in terms of Ti Atom and Li Atom | Effects | | |
|---|---|---|---|---|---|---|---|---|---|
| | | Average Particle Diameter (μm) | ICP Result (ppm) *in terms of Ti atom | Ti Particle of 1 μm or Smaller in Particle Diameter (%) | Ti Particle of 2 μm or Smaller in Particle Diameter (%) | | Color Tone | Transparency | Weather Resistance |
| Example 1 | 1 | 2.0 | 30 | 40 | 72 | 0.3 | A | A | A |
| Example 2 | 1 | | 40 | 10 | 1 | 2 | 0.1 | A | A | AA |
| Example 3 | 3 | 1.9 | 30 | 30 | 71 | 75 | AA | A | A |
| Example 4 | 4 | 20 | 25 | 3 | 8 | 5 | AA | A | AA |
| Example 5 | 3 | 2.5 | 35 | 6 | 18 | 1.15 | AA | A | AA |

*"The average particle diameter of the oxide of titanium", "the oxide of titanium (Ti particle) having a particle diameter of 0.010 μm or larger and 1.0 μm or smaller", and "the oxide of titanium (Ti particle) having a particle diameter of 0.010 μm or larger and 2.0 μm or smaller" of Example 2 and 4 are replaced in reading by "the average particle diameter of the whole of the titanium oxide and the lithium titanate", "the titanium oxide and the lithium titanate having a particle diameter of 0.010 μm or larger and 1.0 μm or smaller", and "the titanium oxide and the lithium titanate having a particle diameter of 0.010 μm or larger and 2.0 μm or smaller", respectively.

*"The average particle diameter of the oxide of titanium", "the oxide of titanium (Ti particle) having a particle diameter of 0.010 μm or larger and 1.0 μm or smaller", and "the oxide of titanium (Ti particle) having a particle diameter of 0.010 μm or larger and 2.0 μm or smaller" of Example 5 are replaced in reading by "the average particle diameter of the whole of the titanium oxide and the lithium carbonate", "the titanium oxide and the lithium carbonate having a particle diameter of 0.010 μm or larger and 1.0 μm or smaller", and "the titanium oxide and the lithium carbonate having a particle diameter of 0.010 μm or larger and 2.0 μm or smaller", respectively.

TABLE 3

| | Production Example | Oxide of Titanium | | | | Ti/Li *in terms of Ti Atom and Li Atom | Effects | | |
|---|---|---|---|---|---|---|---|---|---|
| | | Average Particle Diameter (μm) | ICP Result (ppm) *in terms of Ti atom | Ti Particle of 1 μm or Smaller in Particle Diameter (%) | Ti Particle of 2 μm or Smaller in Particle Diameter (%) | | Color Tone | Transparency | Weather Resistance |
| Comparative Example 1 | 1 | none | 0 | none | none | 0 | A | A | C |
| Comparative Example 2 | 1 | 2.0 | 200 | 43 | 70 | 2 | B | C | AA |
| Comparative Example 3 | 2 | 20 | 100 | 3 | 6 | 0.83 | B | B | A |
| Comparative Example 4 | 3 | none | 0 | none | none | 0 | AA | A | C |
| Comparative Example 5 | 5 | none | 0 | none | none | 0 | A | B | C |
| Comparative Example 6 | 3 | 40 | 100 | 0.5 | 1 | 250 | B | B | A |
| Comparative Example 7 | 6 | 0.01 | 25 | 100 | 100 | 5 | A | A | B |
| Comparative Example 8 | 7 | 200 | 25 | 0 | 0 | 5 | B | A | A |

*"The average particle diameter of the oxide of titanium", "the oxide of titanium (Ti particle) having a particle diameter of 0.010 μm or larger and 1.0 μm or smaller", and "the oxide of titanium (Ti particle) having a particle diameter of 0.010 μm or larger and 2.0 μm or smaller" of Comparative Example 3 and 6 are replaced in reading by "the average particle diameter of the whole of the titanium oxide and the lithium titanate", "the titanium oxide and the lithium titanate having a particle diameter of 0.010 μm or larger and 1.0 μm or smaller", and "the titanium oxide and the lithium titanate having a particle diameter of 0.010 μm or larger and 2.0 μm or smaller", respectively.

The present application is based on the Japanese Patent Application (Japanese Patent Application No. 2013-095168), filed on Apr. 30, 2013 with Japan Patent Office, the entire contents of which are incorporated hereby by reference.

INDUSTRIAL APPLICABILITY

The composition containing an oxide of titanium according to the present invention has an industrial applicability in applications requiring the weather resistance.

The invention claimed is:
1. A composition containing an oxide of titanium, comprising:
a conjugated dienic polymer, the oxide of titanium and lithium compound,
wherein a content of the oxide of titanium is 0.10 to 75 ppm by mass in terms of titanium atom; and
an average particle diameter of the oxide of titanium is 1.0 to 100 μm.
2. The composition containing the oxide of titanium according to claim 1, wherein a ratio (Ti/Li) of a content of the oxide of titanium in terms of titanium atom to a content of the lithium compound in terms of lithium atom is 0.0010 to 1.3.

3. The composition containing the oxide of titanium according to claim 1, wherein the content of the oxide of titanium is 0.10 to 50 ppm by mass in terms of titanium atom.

4. The composition containing the oxide of titanium according to claim 1, wherein the content of the oxide of titanium is 0.10 to 30 ppm by mass in terms of titanium atom.

5. The composition containing the oxide of titanium according to claim 1, wherein a content of the oxide of titanium, which has a particle diameter of 0.010 μm or larger and 1.0 μm or smaller is 20% by mass or lower based on 100% by mass of a total amount of the oxide of titanium.

6. The composition containing the oxide of titanium according claim 1, wherein the oxide of titanium comprises at least one selected from the group consisting of titanium oxide, hydrous titanium oxide, titanium hydroxide and lithium titanate.

7. The composition containing the oxide of titanium according to claim 1, wherein the conjugated dienic polymer comprises a hydrogenated conjugated dienic polymer.

8. The composition containing the oxide of titanium according to claim 1, wherein the conjugated dienic polymer comprises a vinyl aromatic monomer unit.

9. The composition containing the oxide of titanium according to claim 1, wherein the oxide of titanium comprises a reaction product of a titanium compound, wherein the titanium compound is used as a hydrogenation catalyst for the conjugated dienic polymer.

10. The composition containing the oxide of titanium according to claim 9, wherein the titanium compound comprises a titanocene compound.

11. The composition containing the oxide of titanium according to claim 2, wherein the content of the oxide of titanium is 0.10 to 50 ppm by mass in terms of titanium atom.

12. The composition containing the oxide of titanium according to claim 2, wherein the content of the oxide of titanium is 0.10 to 30 ppm by mass in terms of titanium atom.

13. The composition containing the oxide of titanium according to claim 2, wherein the content of the oxide of titanium, which has a particle diameter of 0.010 μm or larger and 1.0 μm or smaller is 20% by mass or lower based on 100% by mass of a total amount of the oxide of titanium.

14. The composition containing the oxide of titanium according to claim 3, wherein the content of the oxide of titanium, which has a particle diameter of 0.010 μm or larger and 1.0 μm or smaller is 20% by mass or lower based on 100% by mass of a total amount of the oxide of titanium.

15. The composition containing the oxide of titanium according to claim 4, wherein the content of the oxide of titanium, which has a particle diameter of 0.010 μm or larger and 1.0 μm or smaller is 20% by mass or lower based on 100% by mass of a total amount of the oxide of titanium.

16. The composition containing the oxide of titanium according to claim 1, wherein the content of the oxide of titanium is 0.10 to 50 ppm by mass in terms of titanium atom, and a content of the oxide of titanium, which has a particle diameter of 0.010 μm or larger and 1.0 μm or smaller is 20% by mass or lower based on 100% by mass of a total amount of the oxide of titanium.

17. The composition containing the oxide of titanium according to claim 1, wherein the content of the oxide of titanium is 0.10 to 30 ppm by mass in terms of titanium atom, and a content of the oxide of titanium, which has a particle diameter of 0.010 μm or larger and 1.0 μm or smaller is 20% by mass or lower based on 100% by mass of a total amount of the oxide of titanium.

18. A polymer composition comprising the composition containing the oxide of titanium according to claim 1.

19. A molded article comprising the polymer composition according to claim 18.

* * * * *